United States Patent [19]

Taska

[11] Patent Number: 4,856,091
[45] Date of Patent: Aug. 8, 1989

[54] RADIATION-COUPLED DAISY CHAIN

[75] Inventor: John L. Taska, Naperville, Ill.

[73] Assignees: American Telephone and Telegraph Company, New York, N.Y.; AT&T Information Systems Inc., Morristown, N.J.

[21] Appl. No.: 43,073

[22] Filed: Apr. 27, 1987

[51] Int. Cl.[4] ............................. H04B 9/00; H04J 3/24
[52] U.S. Cl. ................................. 455/607; 455/603; 455/613; 340/825.52; 370/92
[58] Field of Search ............... 455/601, 603, 606, 607, 455/613; 340/825.52, 825.07; 370/86, 89, 92, 95

[56] References Cited

U.S. PATENT DOCUMENTS

| | | | |
|---|---|---|---|
| 4,063,083 | 12/1977 | Cathey et al. | 455/613 |
| 4,635,192 | 1/1987 | Ceccon et al. | 364/200 |
| 4,660,141 | 4/1987 | Ceccon et al. | 364/200 |
| 4,720,634 | 1/1988 | D'Auria et al. | 455/607 |
| 4,742,572 | 5/1988 | Yokoyama | 455/607 |

FOREIGN PATENT DOCUMENTS 0035905 3/1977 Japan .................................... 455/607

OTHER PUBLICATIONS

H. Iida et al., "Method of LSI Personalization After Resetting", *IBM Technical Disclosure Bulletin*, vol. 27, No. 7A, (12-84), p. 3976.

S. P. Joshi, "Making the LAN Connection With a Fiber Optic Standard", *Computer Design*, (9-1-85), pp. 64-69.

*Primary Examiner*—Robert L. Griffin
*Assistant Examiner*—Andrew J. Telesz, Jr.
*Attorney, Agent, or Firm*—David Volejnicek

[57] ABSTRACT

In a processing system (FIG. 1), peripheral boards (101-103) interconnected by a stack bus with a system board (100) each have an optical emitter (163) mounted on one face and an optical detector (162) mounted on the other face. The system board has an optical emitter mounted thereon. Emitters and detectors are arranged in a daisy-chain fashion: the emitter of one board faces the detector of the next board. To assign I.D.s (e.g. addresses) to boards, the system board turns on its emitter and transmits on the bus an I.D. The adjacent board's detector is illuminated and causes the board to latch the I.D. The system board turns off its emitter, signals the adjacent board to turn on its emitter, and transmits another I.D. on the bus. The next board's detector is thus illuminated and causes the board to latch the I.D. The system board performs the procedure for each peripheral board.

18 Claims, 4 Drawing Sheets

RADIATION-COUPLED DAISY CHAIN

TECHNICAL FIELD

The invention relates generally to electronic systems, and relates particularly to bus communication systems.

BACKGROUND OF THE INVENTION

Many electronic systems comprise a plurality of functional units interconnected by a common communication medium. An example of such systems is a typical computer which generally comprises a plurality of peripheral units interconnected with a processing unit by a communication bus that is common to all units. In many such systems, and particularly in computers, some means must be provided by which a central administrative unit, such as the processing unit, can access another functional unit, such as a peripheral circuit pack (also referred to as a peripheral circuit board), individually, to the exclusion of other units, over the common medium. Clearly, a way to accomplish this is to provide a means for logically distinguishing between the units, such as by configuring each unit to respond to a particular unique I.D. or address spectrum.

However, it is desirable to have systems configurable and reconfigurable by either system users or automatically by the system itself. In such a case, the problem arises of how to individually access the units in order to configure them, that is, in order to assign to them the logically-distinguishing characteristic, such as a unique I.D. or address spectrum, in the first place.

Many techniques for doing this are known. For example, each unit may be equipped with I.D. or address-spectrum-defining switches or straps that are manually settable by the user. However, this technique has reliability problems because it is dependent on user dexterity, accuracy, understanding of system configuration, and ability to follow instructions. Also, it is problematical in that it does not allow for automatic system configuration or reconfiguration. Another technique involves the use of backplanes, signalpin staging fields, cables, or other means by which leads, contacts, or other electrical and/or mechanical connections that are dedicated to a particular unit may be connected only to that unit. However, by definition, this technique undesirably requires that different connections be made to different units. Thus, a problem of this technique is that it is not suitable for use with buses such as stack buses wherein all bus connections are made in common to all units.

SUMMARY OF THE INVENTION

This invention is directed to solving these and other problems of the art. According to the invention, a plurality of units, such as circuit boards, that are arranged in a series include a signaling link comprising a plurality of radiation emitters and radiation detectors. Each emitter is connected to a different unit. When it is enabled (that is, when it is made responsive to input stimuli), an emitter emits radiation in response to receipt of a control signal. Each detector is also connected to a different unit and is positioned to receive, through free space, radiation emitted by the emitter which is connected to the preceding unit in the series. A detector responds to receipt of radiation by enabling the emitter connected to the same unit.

In use, the emitter of the first unit in the series is turned on to irradiate the detector of the second unit, thereby to select the second unit from among all of the units for access, and also to cause enablement of the emitter of the second unit. Receipt of a control signal then causes the enabled emitter of the second unit to turn on and to irradiate the detector of the third unit. This selects the third unit for access, and also causes enablement of the emitter of the third unit. And so on. The invention thereby advantageously enables selective access to be made to individual ones of a set of one or more units.

According to an illustrative example of the invention, an apparatus, such as a computer, that includes a plurality of units--illustratively a system circuit board and one or more peripheral circuit boards-- that are interconnected by a communication medium-illustratively a stack bus--also includes an optical or other radiation link that serially interconnects the plurality of units. The optical link includes a plurality of first means---illustratively registers--each illustratively associated with a different unit and each when enabled for latching a first signal received over the medium. Illustratively, the first signals latched by different first means are different and thus serve as unit I.D.s to distinguish between the plurality of units. To control the first means such that each will latch a different first signal, the link further includes the following. A plurality of radiation emitters--illustratively optical emitters such as LEDs---each one of which is mounted on a different unit. A plurality of second means--illustratively switch circuits--each one of which is connected to a different emitter and a different first means and selectively turns on the connected emitter in response to a second signal received over the medium when a first signal received over the medium matches the first signal that is latched by the connected first means. A plurality of radiation detectors--illustratively photocells--each one of which is mounted on a different unit and is positioned for irradiation by the emitter mounted on the preceding unit in the series, and a different one of which is connected to each first means and enables the connected first means when irradiated.

Use of the above-characterized apparatus advantageously solves the problem of selectively accessing individual units, in the following manner. THe first unit in the series--the system board--turns on its emitter, thereby causing the first means of the second unit--the first peripheral board--in the series to become enabled, and transmits a first signal--a unit I.D.--on the medium. The enabled first means latches the first signal and thereby associates the I.D. with the second unit. Subsequently, illustratively after it has turned off its emitter, the first unit transmits on the medium the same first signal and a second signal which is an emitter turn-on command. Since the transmitted first signal matches the latched first signal of the second unit, the second unit's second means become enabled and respond to the second signal by turning on the second unit's emitter. This causes the first means of the third unit in the series to become enabled. The first unit then transmits another first signal--a different unit I.D.--on the medium, which is latched by the first means of the third unit. Illustratively, the first unit then transmits on the medium the first signal that is latched by the first means of the second unit and a second signal that is an emitter turn-off command, thereby to cause the second unit's second means to become enabled and respond to the second signal by turning off the second unit's emitter. The first unit can subsequently proceed in operation as it did with respect to the second unit, in order to cause an I.D. to become assigned to the next unit in the series, and so on. Advantageously, the system may thus be configured and reconfigured automatically, without manual manipulation by the user, and without use of dedicated electrical or mechanical connections to individual units.

These and other advantages and features of the present invention will become apparent from the following description of an illustrative embodiment of the invention, taken together with the drawing.

DETAILED DESCRIPTION

Figure 1:
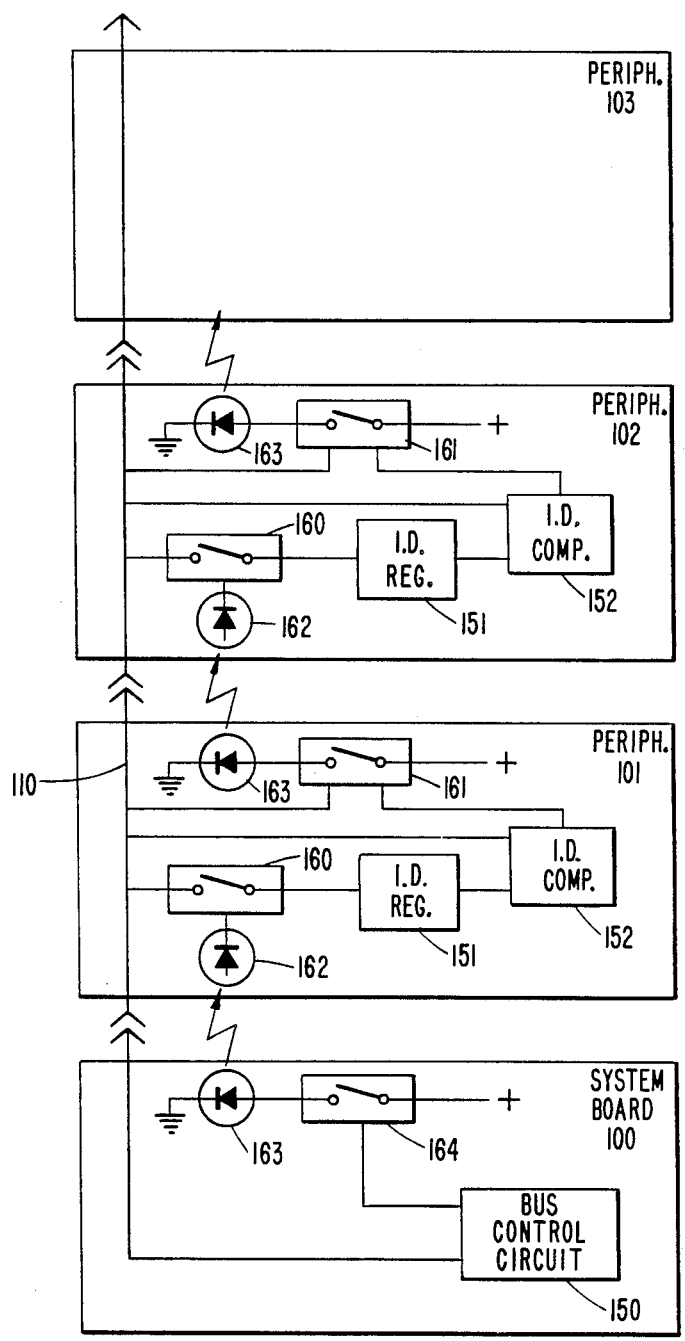
FIG. 1 is a block diagram of a processing system including an illustrative embodiment of the invention.

FIG. 1 shows a block diagram of a processing system comprising a system circuit pack or board 100 and a plurality of peripheral circuit packs or boards 101–103 arranged in a series and interconnected by a peripheral bus 110. The system of FIG. 1 is illustratively a personal computer or a workstation. System board 100 includes the basic system processing circuits, such as a central processing unit and a memory management unit (not shown). Each peripheral board 101–103 comprises circuitry (not shown) that implements different functions or options for the system. For example, one peripheral board may have input and output circuitry for interfacing the system to a local area network, while another peripheral board may comprise a disk-based secondary storage mechanism.

Figure 2:
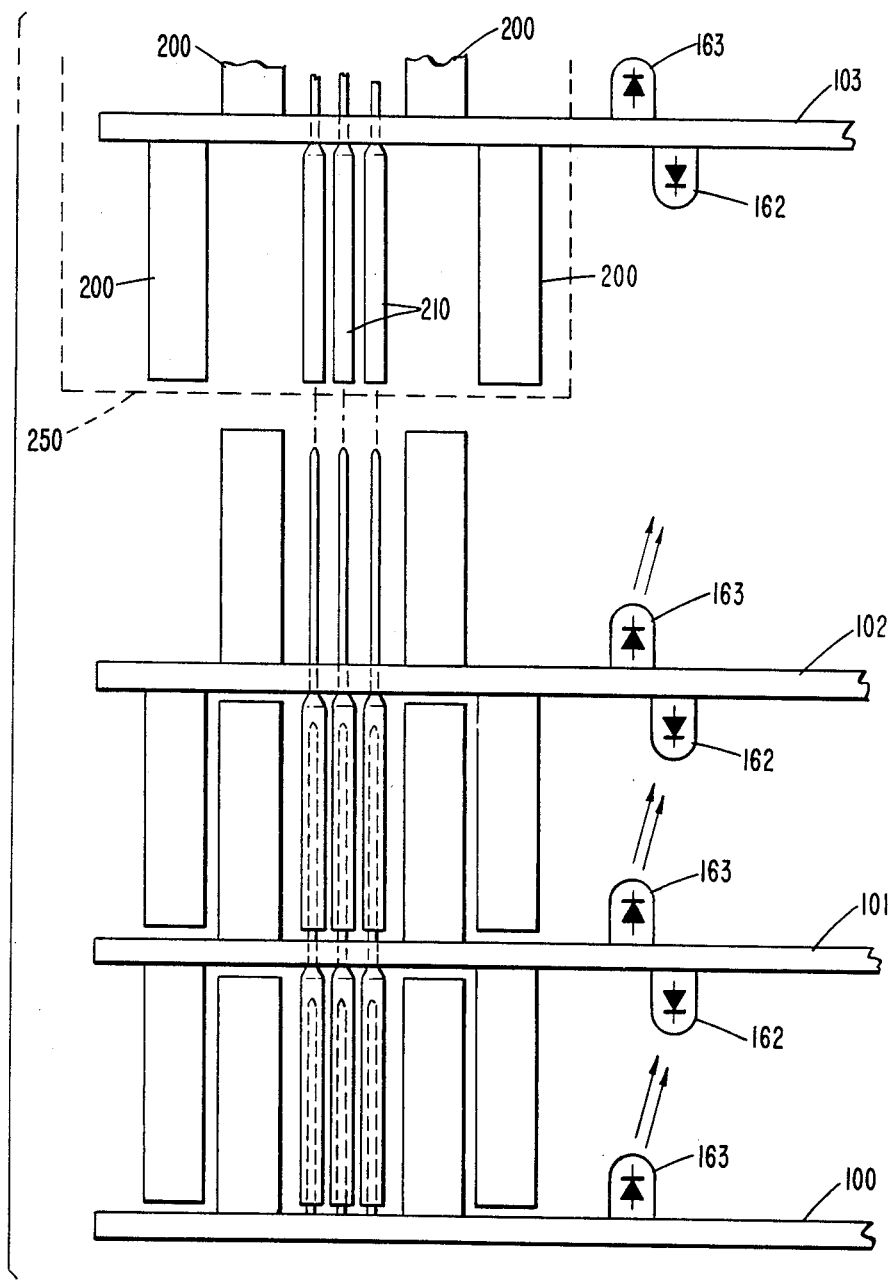
FIG. 2 is a side view of a connector portion of the system of FIG. 1.

Peripheral bus 110 is illustratively a known stacked bus shown in greater physical detail in FIG. 2. Bus 110 comprises a plurality of conventional interconnecting connectors 250. Each circuit board 100–103 has a connector 250 mounted thereon such that circuit boards 100–103 may be interconnected therethrough by stacking circuit boards 100–103 on top of each other and mating connectors 250 of adjacent boards. Each connector 250 comprises a plurality of electrically conductive connector elements 210 that are electrically isolated from each other, and housing elements 200 that surround connector elements 210 to protect them and to help align them with connector elements 210 of connectors 250 of adjacent boards. Electrical connections are made on each board 100–103 to all connector elements 210 of that board's connector 250. Hence, all boards 100–103 are connected in parallel to bus 110 and have in common all electrical connections made by bus 110. Bus 110 makes no connections to any one board 100–103 that it does not also make to all other boards 100–103. Hence, the series of boards 100–103 is interconnected in parallel by bus 110.

Alternatively, bus 110 extends in parallel to all peripheral boards 101–103, in that connector elements 210 make an appearance at every board 101–103, but each board 101–103 may make electrical connections to only a selected subset of elements 210.

Referring back to FIG. 1, it shows only circuitry that is relevant to an understanding of the invention. System board 100 is the first board in the series and includes a bus control circuit 150, a switch circuit 164 and an optical emitter 163. Circuit 150 transmits and receives signals across peripheral bus 110 in a conventional manner. Circuit 150 also controls operation of switch circuit 164. Circuit 164 selectively turns power on and off to optical emitter 163, as directed by circuit 150. Circuit 164 may be any one of a wide variety of circuits suitable for such purpose. Optical emitter 163 is a light emitting diode, for example. For purposes of this illustrative embodiment, the terms "optical" and "light" refer to radiation anywhere within the spectrum from infrared to ultraviolet, inclusive.

For purposes of this application, peripheral boards 101–103 are identical. Each peripheral board 101–103 includes an optical receiver 162, switch circuit 160, I.D. register 151, I.D. comparator 152, switch circuit 161, and optical emitter 163. Optical receiver 162 is, for example, a photodetector that controls operation of switch circuit 160 to selectively connect and disconnect bus 110 with an input port of I.D. register 151. I.D. register 151 is programmable to store a unique I.D. that identifies the particular peripheral board 101–103. An output port of I.D. register 151 is connected to one input port of I.D. comparator 152, while another input port of comparator 152 is connected to bus 110. Comparator 152 compares contents of I.D. register 151 with signals received over bus 110 to determine if they match. Output of comparator 152 enables and disables switch circuit 161 to respond to control inputs received over bus 110, to which circuit 161 is connected. When comparator 152 detects a match between its inputs, it enables switch circuit 161 to turn power on and off to optical emitter 163 under direction of signals received by circuit 161 over bus 110. Circuits 161 and 160 may be any of a wide variety of circuits suitable for such purposes.

Returning to consideration of FIG. 2, optical emitters 613 and detectors 162 are mounted on opposite faces or sides of boards 101–103 in such position that when the boards 100–103 are arranged serially in face-toface proximity by being stacked one on top of another, and are interconnected by their connectors 250, emitter 163 of system board 100 faces through free space detector 162 of adjacent peripheral board 101; emitter 163 of board 101 faces through free space detector 162 of adjacent peripheral board 102; emitter 163 of board 102 faces through free space detector 162 of next adjacent peripheral board 103, and so on. The detector of any board is thus positioned to be illuminated only by the emitter of the preceding board in the series and by no other emitter.

Figure 3:
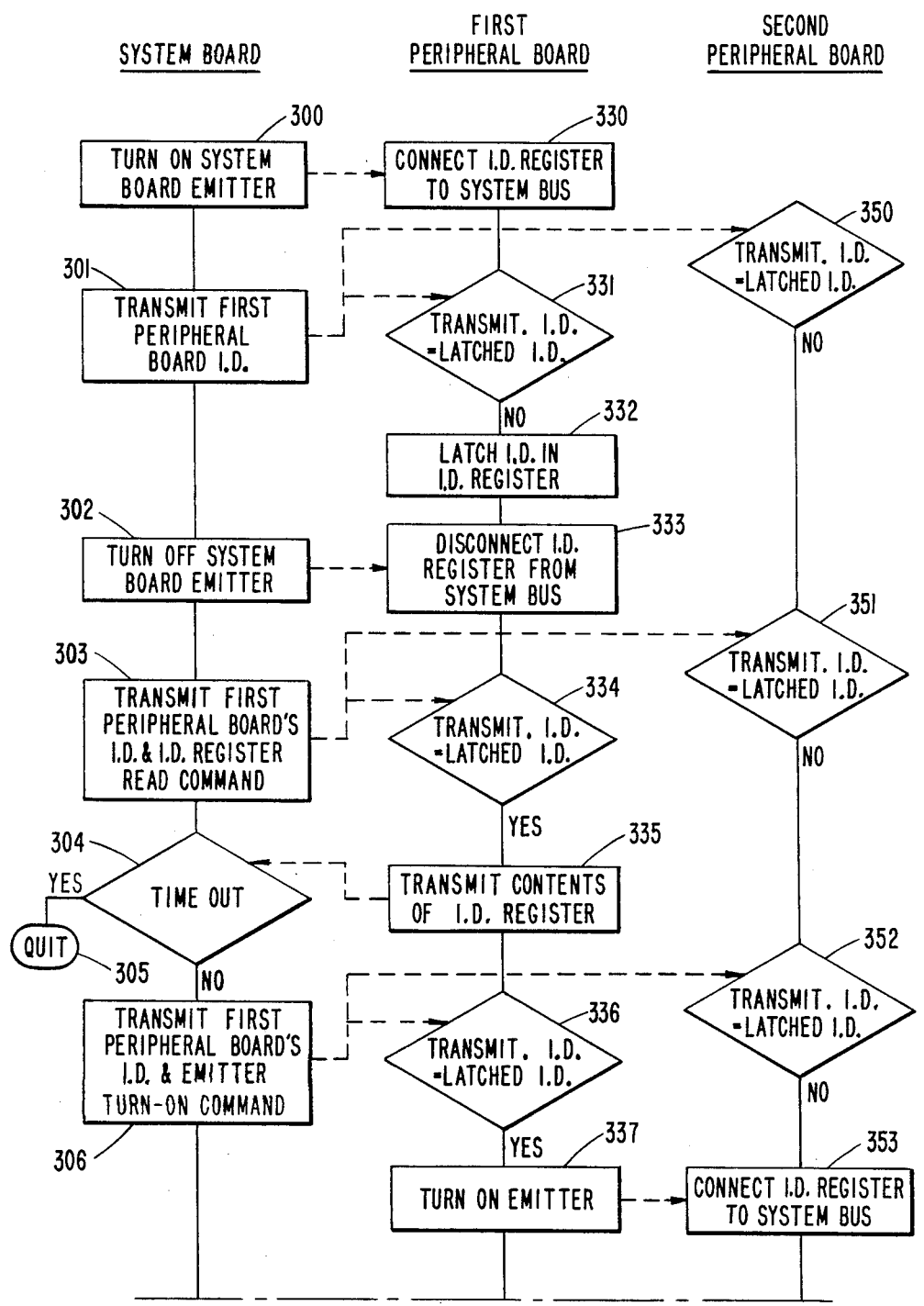
FIGS. 3 and 4 are a flow diagram of initializing operations of the system of FIG. 1.
Figure 4:
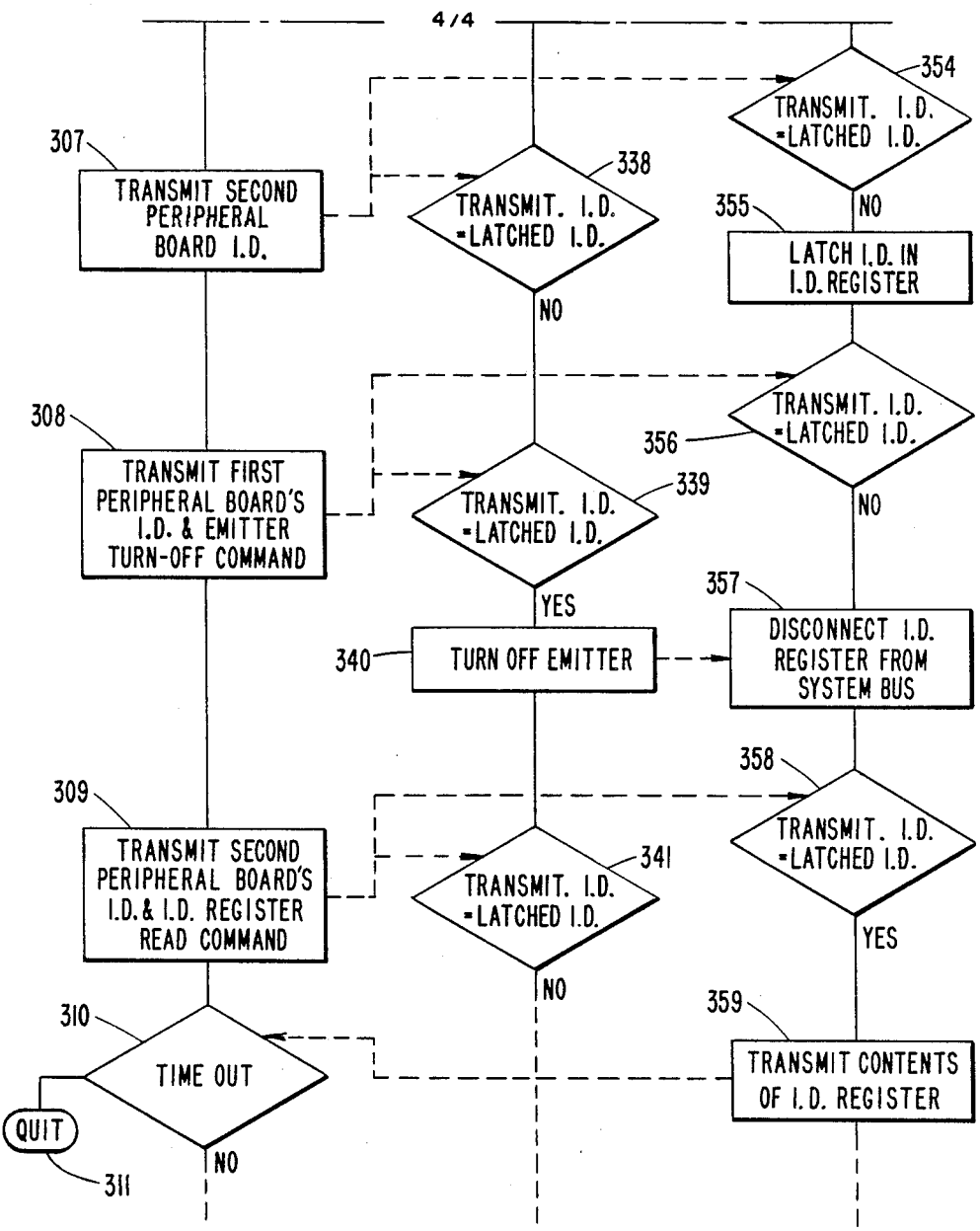
Figure 5:
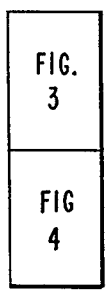
FIG. 5 is a composite showing the arrangement of FIGS. 3 and 4 to form a single diagram.

A description of the operation and use of the above-described structures follows. When the system of FIG. 1 is to be configured or reconfigured following power-up or system reset, respectively, the contents of all I.D. registers 151 are illustratively set to zero. Hence, even though the system may have been configured previously, there is now no way for system board 100 to distinguish between peripheral boards 101–103 by means of bus 110. System board 100 therefore proceeds to supply each peripheral board 101–103 with its own unique I.D., in the manner flowcharted in FIGS. 3 and 4.

Bus control circuit 150 causes switch circuit 164 to connect power to emitter 163. In response, emitter 163 turns on and emits light, at step 300. Circuit 150 also transmits on bus 110 a signal comprising a peripheral board I.D. that it wishes to assign to peripheral board 101, at step 301. Illustratively, the I.D. comprises the most significant address bits of a portion of the system address spectrum that is to be assigned to peripheral board 101.

The I.D. transmitted by circuit 150 on bus 110 is received by I.D. comparators 152 of all peripheral boards 101-103 in parallel and is compared with contents of associated I.D. registers 151, at steps 331 and 350. Because of this time no I.D. register contains the received I.D., no I.D. comparator 152 detects a match.

However, light emitted by emitter 163 illuminates detector 162 of peripheral board 101. This serves to select board 101 from among boards 101-103 for access. In response, detector 1652 causes switch circuit 160 to connect bus 110 to I.D. register 151, at step 330, thereby enabling I.D. register 151 to receive, latch, and store the I.D. transmitted by circuit 150 on bus 110, at step 332.

Circuit 150 next stops transmitting the board I.D. on bus 110. Circuit 150 also causes switch circuit 164 to disconnect power from emitter 163. In response, emitter 163 turns off and ceases to emit light, at step 302.

Detector 162 of board 101 is no longer illuminated, and therefore it causes circuit 160 to disconnect bus 110 from register 151, at step 333.

Circuit 150 now reads I.D. register 151 of board 101 via bus 110, in a conventional manner. Illustratively, register 151 is mapped into the address spectrum of board 101, and circuit 150 transmits on bus 110 the address of register 151 (which includes the board 101 I.D. as a portion thereof) and a read request signal, at step 303.

The address and read signal transmitted on bus 110 are received by all peripheral boards 101-103 but only board 101 responds thereto. Illustratively, the transmitted board I.D. is compared at each board 101-103 with contents of that board's I.D. register 151, at steps 334 and 351, and if there is a match, as at step 334, the contents of I.D. register 151 are transmitted on bus 110 in response to the read request signal, at step 335. These operations are conventional in nature and are performable by conventional circuitry (not shown).

If, in reply to its read request, circuit 150 does not receive the contents of register 151 of board 101 within a predetermined time period, from making the request at step 304, it serves as an indication that no peripheral boards 101-103 are attached to system board 100. Circuit 150 therefore terminates its operation of assigning I.D.s to peripheral boards, at step 305.

If circuit 150 does receive the contents of register 151 of board 101 within the predetermined period, it transmits on bus 110 the I.D. that is assigned to board 101 along with an emitter turn-on control signal for circuit 161, at step 306. Illustratively, circuit 161 is mapped into the address spectrum of board 101, and circuit 150 transmits the address of circuit 161 and a control signal such as a read or a write control signal.

I.D. comparator 152 of each board 101-103 receives the board I.D.--illustratively the most significant address bits--from both register 151 and bus 110 and compares them, at steps 336 and 352. If they match, as at step 336, comparator 152 generates a signal that enables circuit 161 to respond to the control signal transmitted by circuit 150. Because only register 151 of board 101 contains the same I.D. as is being received on bus 110, only circuit 161 of board 101 becomes enabled. Enabled circuit 161 receives the emitter turn-on control signal, and in response connects power to emitter 163 to board 101, thereby causing emitter 163 to turn on and emit light, at step 337.

Light emitted by emitter 163 of board 101 illuminates detector 162 of board 102, thereby selecting board 102 from among boards 101-103 for an I.D. assignment access and causing circuit 160 to connect bus 110 to register 151, at step 353.

Circuit 150 now transmits on bus 110 a different peripheral board I.D. that it wishes to assign to peripheral board 102, at step 307. This I.D. is received by comparators 152 of all boards 101-103, and compared with I.D. register 151 contents, at steps 338 and 354, but because it does not match contents of any register 151, no circuit 161 becomes enabled thereby. However, because register 151 of board 102 is presently connected by circuit 160 to bus 110, this I.D. is received and stored thereby, at step 355.

Circuit 150 then stops transmitting the I.D. of board 102 on bus 110 and instead transmits the I.D. of board 101 accompanied by an emitter turn-off command, at step 308.

The I.D. is received by I.D. comparators 152 of all boards 101-103 and is compared with I.D. register 151 contents, at steps 339 and 356. Only I.D. comparator 152 of board 101 finds a match, at step 339, and generates a signal enabling circuit 161 to respond to the emitter turn-off command. Enabled circuit 161 responds by causing emitter 163 of board 101 to turn off, at step 340.

When emitter 163 of board 101 turns off, detector 162 of board 102 ceases to be illuminated and therefore causes circuit 160 to disconnect I.D. register 151 of board 102 from bus 110, at step 357.

Circuit 150 now reads I.D. register 151 of board 102 via bus 110, at step 309-311, in the same manner as it previously read register 151 of board 101. Board 102 responds, at steps 358-359, in the manner described at steps 334-335 for board 101.

Operation now continues in the above-described manner but with respect to board 103. The cycle is repeated until each board 101-103 on bus 110 has been assigned on I.D.

Circuit 150 has no prior knowledge that board 103 is the last board. It therefore performs the activities of the cycle once more. However, there is no other peripheral board to latch the new I.D. and to respond to control signals generated by circuit 150. Hence, when circuit 150 tries to read the contents of the I.D. register of the nonexistent peripheral board, it receives no response.

Because it has not received the requested I.D. register contents within a predetermined time period, circuit 150 knows that board 103 was the last board in the stack of bus 110, and that all boards have been initialized. Circuit 150 therefore stops the I.D. assignment activities. System operation now continues in a conventional manner.

Of course, various changes and modifications to the illustrative embodiment described above will be apparent to those skilled in the art. For example, the invention may be used not only in a processing system, but in any system requiring a means for selecting a unit from among a plurality of units. The peripheral bus 110 may be replaced with any other communication medium. Any other type of radiation emitters and detectors may be used instead of light emitters and detectors in the daisychain. Circuit 150 need not read I.D. register 151 of a board 101-103, but may read a board-type-specifying register or some other readable entity, or in general may initiate some other type of transaction that elicits a response from the addressed board. Furthermore, the daisy-chain protocol may be modified such that, in order for a peripheral board's emitter to be enabled to respond to a turn-on command, the board's detector must be illuminated. Hence, for an emitter to turn on, all preceding emitters in the series must be turned on. Such changes and modifications can be made without departing from the spirit and the scope of the invention and without diminishing its attendant advantages. It is therefore intended that such changes and modifications be covered by the following claims.

What is claimed is:

1. An apparatus comprising:
a plurality of units;
a communication medium interconnecting the plurality of units; and
a link interconnecting the plurality of units in series and including
a plurality of first means coupled to the medium, each when enabled for latching a first signal received over the medium,
a plurality of emitters each mounted on a different unit,
a plurality of second means connected to the medium and each connected to a different emitter and a different first means, each for selectively turning on the connected emitter when a second signal received over the medium matches the first signal latched by the connected first means, and
a plurality of detectors, a different one connected to each first means, for enabling the connected first means when irradiated, each mounted on a different unit and positioned for irradiation through free space by the emitter mounted on the preceding unit in the series.

2. The apparatus of claim 1 wherein each second means selectively turns on the connected emitter in response to a third signal received over the medium when the second signal matches the latched first signal.

3. The apparatus of claim 2 wherein the third means comprise means for transmitting on the medium a fourth signal for requesting any unit whose first means latch the first signal matching the fourth signal to respond, and for causing the third means to stop operating if the requested response is not received within a predetermined time period.

4. The apparatus of claim 1 further comprising
third means connected to the medium, for transmitting the first and the second signals on the medium; and
wherein the link further comprises
means, connected to the third means and the emitter mounted on a unit that is first in the series, for selectively turning the connected emitter on under control of the third means.

5. The apparatus of claim 1 wherein the link is an optical link, the emitters are optical emitters, the detectors are optical detectors, and irradiation is illumination.

6. A processing system comprising:
a system circuit board;
a set of peripheral circuit boards comprising at least one peripheral circuit board, the system board and the peripheral boards physically positioned serially in face-to-face proximity with each other and the system board being the first board in the series;
a bus electrically interconnecting the boards in parallel;
each peripheral board comprising
an optical emitter mounted on a face thereof,
an optical detector mounted on opposite face thereof and optically coupled through free space to the emitter of the adjacent board preceding in the series,
a register for storing a board I.D. received on the bus when coupled thereto;
a first switch circuit for selectively coupling the register to the bus under control of the detector, the detector causing the first circuit to couple the register to the bus when the detector is illuminated,
a comparator connected to the register and to the bus for determining whether the board I.D. stored by the register matches a board I.D. received on the bus, and
a second switch circuit connected to the comparator, the bus, and the emitter, the second circuit enabled by the comparator's determination of a match to respond to control signals received over the bus for selectively causing the emitter to emit light;
the system board comprising an optical emitter optically coupled through free space to the optical detector of the adjacent board in the series,
first means, for selectively causing the emitter to emit light, and
second means, for transmitting on the bus a board I.D. for storage by a register of a board whose detector is illuminated, when an emitter is emitting light, and also for transmitting on the bus a board I.D. stored by the register of a board and a control signal for controlling the second circuit of that board.

7. The system of claim 6 wherein the second means include
means for transmitting on the bus a board I.D. previously transmitted for storage by a register and a signal for requesting any peripheral board whose register stores that I.D. to respond, and for terminating operation of the second means if a response to the request is not received within a predetermined time interval from transmission of the request.

8. An apparatus, for use with a unit having the following elements: a first arrangement when enabled for latching a received first signal, an emitter, a second arrangement for selectively turning on the emitter in response to a second signal received when a received third signal matches the firs signal latched by the first arrangement, and a detector when irradiated for enabling the first arrangement; the apparatus comprising:
an emitter positioned to irradiate through free space the detector of the unit;
means connected to the emitter for the apparatus for selectively turning on and off the emitter of the apparatus; and
means for transmitting to the unit selectively (a) the first signal, (b) the third signal accompanied by the second signal, and (c) a fourth signal accompanied by a fifth signal for requesting a response from a unit whose first arrangement latches the first signal matching the fourth signal, and for ceasing operation if the requested response is not received within a predetermined time period.

9. The apparatus of claim 8 for use with a set of the units comprising at least one unit connected to the apparatus by a communication medium, wherein
the transmitting means comprise
means for transmitting on the medium a unit I.D. signal for latching by the first arrangement of a unit whose detector is irradiated, for transmitting on the medium a unit I.D. signal stored by the first arrangement of a unit and accompanied by a signal for controlling the second arrangement of that unit, and for transmitting on the medium a unit I.D. previously transmitted for latching by a first arrangement and a unit response request, and for terminating operation if a response to the request is not received within a predetermined time interval from transmission of the request.

10. The apparatus of claim 8 wherein the emitters are optical emitters, the detector is an optical detector, and irradiation is illumination.

11. A circuit board for use with apparatus comprising an electrical bus and a light emitting device, said circuit board comprising:
   bus means connectable to said electrical bus;
   first means aligned with said light emitting device and responsive to a first light signal to store a signal received on said bus means;
   second means for comparing a second signal received on said bus means with the first signal stored by said first means and generating an enable signal when said compared first and second signals match; and
   light emitting means responsive to said enable signal to generate a light signal in response to a third signal received on said bus means.

12. A unit for use with an apparatus having the following elements: an emitter for selectively emitting radiation, a communication medium, and means for transmitting signals on the medium; the unit comprising:
   first means, when coupled to the medium and enabled, for latching a first signal received over the medium;
   an emitter;
   second means, connected to the first means and the emitter of the unit, when connected to the medium for selectively turning on the emitter of the unit in response to a second signal received over the medium when a third signal received over the medium matches the first signal latched by the first means; and
   a detector, positioned for irradiation through free space by one of (a) the emitter of the apparatus or (b) an emitter of another unit arranged in series with the apparatus and the unit that includes the detector, the other unit immediately preceding in the series the unit that includes the detector, the detector connected to the first means for enabling the connected first means when irradiated.

13. The unit of claim 12 wherein
   the first means comprise
   a register for storing a unit I.D. signal received on the medium when coupled thereto, and
   a first switch circuit for selectively coupling the register to the medium under control of the detector, the detector causing the first circuit to couple the register to the medium when the detector is irradiated; and wherein
   the second means comprise
   a comparator, connected to the register, and for connection to the medium, for determining whether the unit I.D. signal stored by the register matches a unit I.D. signal received on the medium, and
   a second switch circuit, connected to the comparator and the emitter of the unit and for connection to the medium, the second circuit enabled by the comparator's determination of a match to respond to a control signal received over the medium for selectively causing the emitter of the unit to emit radiation.

14. The unit of claim 12 wherein radiation is light, the emitters are optical emitters, the detector is an optical detector, and irradiation is illumination.

15. A method of signaling among a plurality of units arranged in a series and comprising a plurality of radiation emitters each connected to a different unit and a plurality of radiation detectors each connected to a different unit, comprising the steps of:
   turning on the emitter of a unit that is first in the series to irradiate the detector of a unit that is second in the series;
   selecting the second unit for access, in response to the irradiation;
   accessing the second unit to enable to emitter of the second unit to respond to a control signal;
   accessing the second unit to elicit a response from the second unit; and
   issuing a control signal to the second unit to turn on the emitter of the second unit, if the response from the second unit is elicited within a predetermined period of time from the accessing to elicit a response.

16. A method of accessing individual ones of a plurality of units arranged in a series and interconnected by a communication medium, the units having a plurality of storage arrangements coupled to the medium each when enabled for latching an I.D. signal received over the medium, a plurality of radiation emitters each mounted on a different unit, a plurality of control arrangements connected to the medium and each connected to a different emitter and a different storage arrangement for selectively turning on and off the connected emitter in response to a control signal received over the medium when and I.D. signal received over the medium matches the I.D. signal latched by the connected storage arrangement, and a plurality of radiation detectors, a different one connected to each storage arrangement, for enabling the connected storage arrangement when irradiated, each mounted on a different unit and positioned for irradiation by the emitter mounted on the preceding unit in the series, the method comprising the steps of:
   (a) turning on the emitter of a unit that is first in the series;
   (b) transmitting on the medium a first I.D. signal;
   (c) turning off the emitter of the first unit;
   (d) transmitting on the medium the first I.D. signal and an emitter turn-on control signal;
   (e) transmitting on the medium a second I.D. signal; and
   (f) transmitting on the medium the first I.D. signal and an emitter turn-off control signal.

17. The method of claim 16 further comprising the steps of:
   (g) transmitting on the medium the second I.D. signal and an emitter turn-on control signal;
   (h) transmitting on the medium a third I.D. signal; and
   (i) transmitting on the medium the second I.D. signal and an emitter turn-off control signal.

18. The method of claim 16 wherein step (c) is followed and step (d) is preceded by the steps of:
   (g) transmitting on the medium a signal for eliciting a response from a unit that is second in the series; and
   (h) receiving on the medium a response to step (g) within a predetermined time period.

* * * * *